United States Patent
Yost, Jr.

[11] 3,714,875
[45] Feb. 6, 1973

[54] METHOD OF MULTISPECTRAL PHOTOGRAPHY AND PROTECTOR

[75] Inventor: Edward J. Yost, Jr., Northport, N.Y.

[73] Assignee: Spectral Data Corp., Hicksville, N.Y.

[22] Filed: July 16, 1969

[21] Appl. No.: 842,133

[52] U.S. Cl. ................................95/12.2, 355/37
[51] Int. Cl. .......................................G03b 33/04
[58] Field of Search ..................355/32, 37; 95/12.2

[56] References Cited

UNITED STATES PATENTS

| | | | |
|---|---|---|---|
| 1,559,316 | 10/1925 | Diernhofer | 355/32 |
| 1,814,672 | 7/1931 | Du Pont | 95/12.2 |
| 1,921,918 | 8/1933 | Goodwin | 95/12.2 |
| 2,281,607 | 5/1942 | Thomas | 95/12.2 X |
| 2,491,018 | 12/1949 | Thomas | 355/32 X |
| 2,553,285 | 5/1951 | Thomas | 355/37 |
| 1,942,638 | 1/1934 | Draper | 95/18 P |
| 2,747,456 | 5/1956 | Waller | 352/70 |
| 2,352,914 | 7/1944 | Rackett | 355/37 |
| 766,389 | 8/1904 | Russell | 95/12.2 |
| 3,003,391 | 10/1961 | Land | 350/173 |

Primary Examiner—John M. Horan
Attorney—Eliot S. Gerber

[57] ABSTRACT

A multispectral camera simultaneously forms four black-and-white pictures of the same subject on a strip of photographic film. A different region of the electromagnetic spectrum is primarily employed in forming each picture. Simultaneously with the forming of the pictures, penlights mounted in the camera form on the film a number of fiducial marks associated with each picture. In projecting the pictures for viewing after they are developed, an additive color viewer is used having a separate projection lens for each picture, the lenses being movable with three degrees of freedom so that the projected images of the fiducial marks can be made to coincide. In this way, the projected images of the four pictures are accurately superimposed to produce a composite image in true or false color. The brightness, saturation, and hue of the projected images of the four pictures are then manipulated in order to extract a wide variety of data regarding the subject.

4 Claims, 10 Drawing Figures

PATENTED FEB 6 1973 3,714,875

INVENTOR.
EDWARD F. YOST, JR.

BY
Brumbaugh, Graves, Donohue & Raymond his ATTORNEYS.

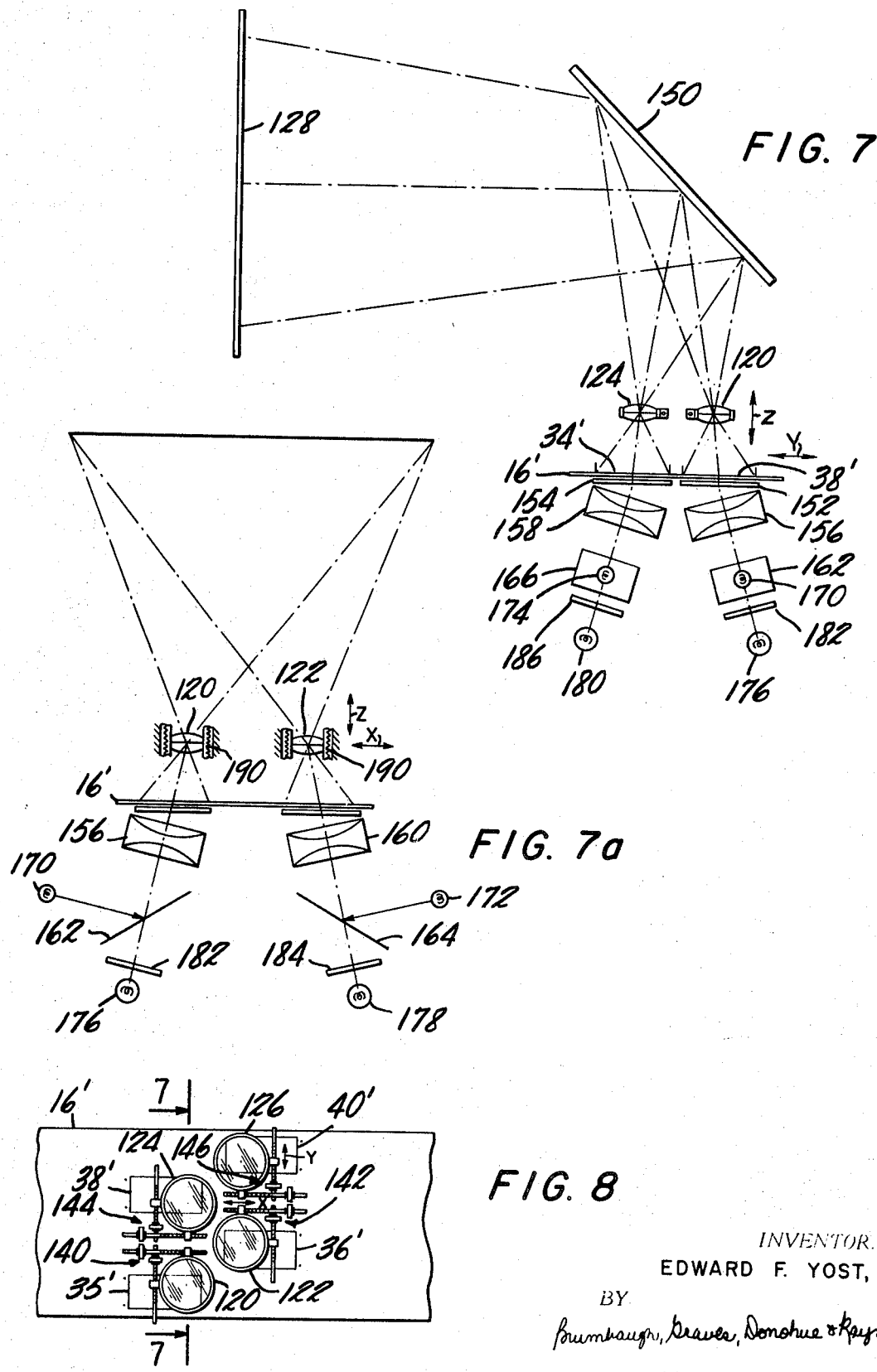

METHOD OF MULTISPECTRAL PHOTOGRAPHY AND PROTECTOR

BACKGROUND OF THE INVENTION

This invention relates to photography conceived broadly as including not only the art or process of producing pictures on sensitized surfaces by the action of electromagnetic radiation but also the art or process of producing images or producing prints corresponding to such pictures. More particularly, the invention relates to multispectral photographic methods and apparatus including a novel and highly-effective multispectral camera and associated additive color viewer for displaying a composite image.

In photography, and particularly in multispectral photography, it is often necessary to project an image on a viewing screen in a very precise position. For example, in multispectral photography, it is necessary to project simultaneously a plurality of pictures in exactly superimposed relation, which implies that it is necessary to control with great precision the relative positions of the projected images.

It is no solution to superimpose a plurality of transparencies for simultaneous projection, because, to cite one reason, an important part of multispectral photographic analysis includes the alteration of the brightness, saturation and hue of the projected image of each picture independently of the others, and this cannot be done if the transparencies are superimposed.

Similarly, it is not easy or even possible in all cases to arrange the transparencies side-by-side and achieve accurate superimposition of the projected images by picking out prominent features in the projections of the several pictures and superimposing them. A given line forming part of a feature in a picture provides the possibility of positional resolution in a given direction only as a function of the sine of the angle between the line and the given direction. Maximum positional resolution is thus possible only in directions normal to the line, and the attainable resolution decreases to zero in directions parallel to the line. Further, a feature prominent on one picture (photographed, for example, through an infra-red filter) need not be prominent or even visible on a related picture (photographed, for example, through a blue filter). Moreover, this method of achieving registration, even where moderately accurate at last, is quite time consuming.

Achieving registration of the superimposed projected images is particularly troublesome in the case where the transparencies for simultaneous projection are spaced apart from each other in two dimensions. Film shrinkage is another factor that makes is especially difficult to achieve exact registration of the superimposed projected images.

A shortcoming of conventional multispectral cameras is that the lenses tend to get in the way of one another. To mitigate this problem, conventional multispectral cameras employ lenses having smaller diameter apertures (and less light-gathering power) than one would wish to have.

Conventional multispectral cameras have the further limitation that they are not adapted for use with both unitary and multiple films.

Another limitation of such cameras is that the shutters for taking the several pictures cannot be adequately synchronized except by means of expensive and elaborate apparatus adding substantially to camera cost. It is necessary to synchronize the forming of the pictures (made from and aircraft or satellite, for example) in order to have each picture the same perspective and external lighting conditions.

SUMMARY OF THE INVENTION

An object of the invention is to remedy the shortcomings of conventional methods and apparatus noted above. In particular, an object of the invention is to provide a multispectral camera having large-aperture lenses adapted for use with unitary or multiple film and designed to produce a plurality of pictures of the same subject from the same perspective in exact synchronism using very inexpensive shutter apparatus and to produce in association with the pictures fiducial marks by which projections of the developed pictures can be rapidly and accurately superimposed. Another object of the invention is to provide an additive color viewer adapted for projection of pictures made by the camera and readily facilitating alteration of the brightness, saturation and hue of the projection of each picture independently of the others.

The foregoing and other objects of the invention are attained, in a representative embodiment thereof, by simultaneously forming a plurality of pictures of the same subject on photographic film, the pictures utilizing respectively primarily different regions of the electromagnetic spectrum, and forming a plurality of fiducial marks in the same relative positions with respect to each of the pictures. The pictures are developed, and they are simultaneously projected on a viewing screen. Corresponding ones of the projected images of the fiducial marks are brought into coincidence, whereby the projected images of the pictures are quickly accurately superimposed.

Differently colored filters are used in projecting the fiducial marks, a differently colored filter being operatively associated with each fiducial mark of a set of corresponding fiducial marks, so that corresponding ones of the projected images of the fiducial marks are colored in accordance with the filters respectively associated therewith to the extent that the projected images fail to coincide and are colored in accordance with the additive colors of the filters to the extent that the projected images coincide.

The fiducial marks are made by light sources mounted in the camera, the light sources being of equal intensity and the fiducial marks being of equal density.

Four pictures are made, the camera having four lenses so arranged that the principal points, defined by the intersections of the optical axes of the lenses with the photographic film, define a parallelogram. This permits the use of lenses of large diameter and low f-number.

The camera employs a focal-plane shutter formed with aperture means so arranged that, when the shutter is actuated, the pictures are all formed simultaneously. Actuation of the shutter also results in formation of the fiducial marks.

Microscope stages are employed for moving the projection lenses of the additive color viewer in the x and y directions (directions normal to each other and also normal to the optical axes of the lenses). In this way, the projected images are moved to any position on the viewing screen. The projection lenses are also movable in the z direction (parallel to their optical axes) for changing the scale of the projected images.

The brightness, saturation, and hue of the projected images are separately controllable in order to facilitate a reduction of data in accordance with any desired multispectral photographic analysis. To this end, each picture is associated with its own projection lamp, its own projection lamp filter, and its own desaturation lamp. The filters can be changed, and the luminous intensity of each projection lamp and each desaturation lamp is separately controllable.

BRIEF DESCRIPTION OF THE DRAWINGS

An understanding of additional aspects of the invention can be gained from a consideration of the following detailed description of a representative embodiment thereof, in conjunction with the accompanying figures of the drawing, wherein:

FIG. 5 is a sectional view in elevation of a portion of the apparatus of FIGS. 1–3, including the portion shown in FIGS. 4 and 4a;

FIG. 7 is a schematic side elevational view, partly in section, of a portion of a representative embodiment of an additive color viewer constructed in accordance with the invention, along the line 7—7 of FIG. 8 and looking in the direction of the arrows;

FIG. 7a is a schematic and elevational view, partly in section, of the apparatus of FIG. 7; and FIG. 8 is a schematic top plan view of a portion of the apparatus of FIGS. 7 and 7a.

DESCRIPTION OF THE PREFERRED EMBODIMENT

Figure 1:
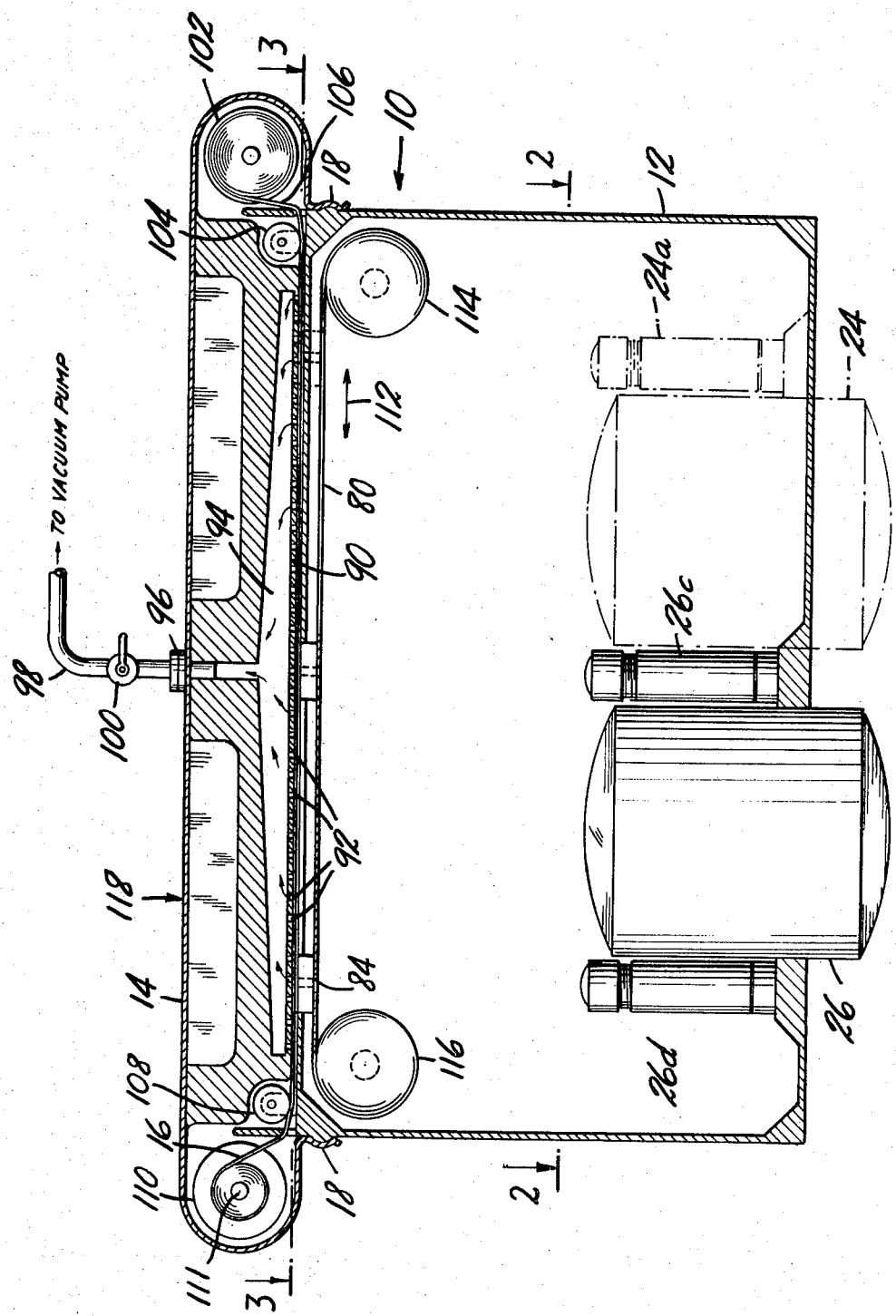
FIG. 1 is a schematic elevational view, partly in section, of a representative embodiment of a multispectral camera constructed in accordance with the invention.

FIG. 1 is a schematic elevational view, partly in section, of a camera 10 constructed in accordance with the invention. The camera 10 includes a case or housing 12 to which a magazine 14 containing a strip of photographic film 16 is adapted to be attached by any suitable means such as clamps 18.

Figure 2:
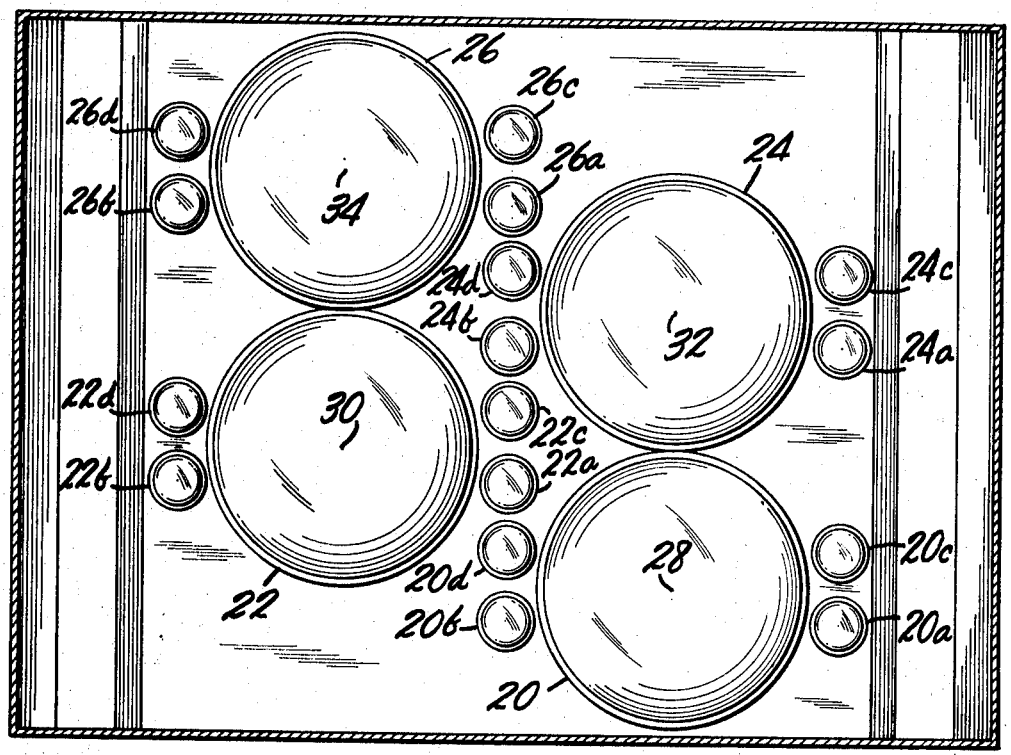
FIG. 2 is a sectional view taken generally along the line 2—2 of FIG. 1 and looking in the direction of the arrows.
Figure 3:
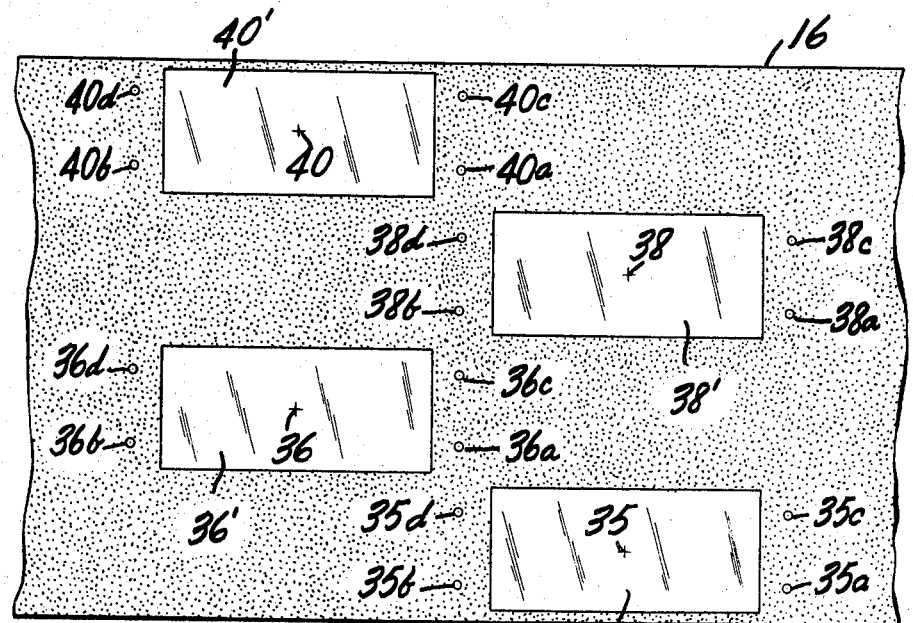
FIG. 3 is a sectional view taken generally along the line 3—3 of FIG. 1 and looking in the direction of the arrows.

The camera 10 includes four lenses 20, 22, 24, and 26, as FIG. 2 shows. The lenses are arranged so that their optical axes 28, 30, 32, and 34, respectively, intersect the film 16 at principal points 35, 36, 38, and 40, as FIG. 3 shows. Images are formed on picture areas 35', 36', 38' and 40' in identical x, y coordinates with respect to these principal points. The principal points 35, 36, 38, and 40 are centered in picture areas 35', 36', 38', and 40' and define a parallelogram, thus maximizing the possible diameter of the lens apertures and permitting the use of lenses 20, 22, 24 and 26 of minimum f-number. This provides the advantage of superior light-gathering ability and the capability of taking usable pictures under conditions of low illumination and of using fine-grain film of lower speed than would otherwise be necessary.

Fiducial marks are associated with each of the pictures 35', 36', 38', and 40'. Associated with the picture 35' are four fiducial 35a, ±b, 35c and 35d. Similarly, fiducial marks 36a, 36b, 36c, and 36d are associated with the picture 36'; fiducial marks 38a, 38b, 38c, and 38d are associated with the picture 38'; and fiducial marks 40a, 40b, 40c, and 40d are associated with the picture 40'.

The fiducial marks are formed by light sources that expose the film 16 when the camera shutter is actuated to take the four pictures. Penlights 20a, 20b, 20c, and 20d associated with the lens 20 facilitate forming of the fiducial marks 35a, 35b, 35c, and 35d, respectively; penlights 22a, 22b, 22c, and 22d associated with the lens 22 facilitate forming of the fiducial marks 36a, 36b, 36c, and 36d; penlights 24a, 24b, 24c, and 24d associated with the lens 24 facilitate forming of the fiducial marks 38a, 38b, 38c, and 38d, respectively; and penlights 26a, 26b, 26c, and 26d associated with the lens 26 facilitate forming of the fiducial marks 40a, 40b, 40c, and 40d, respectively.

Figure 5:
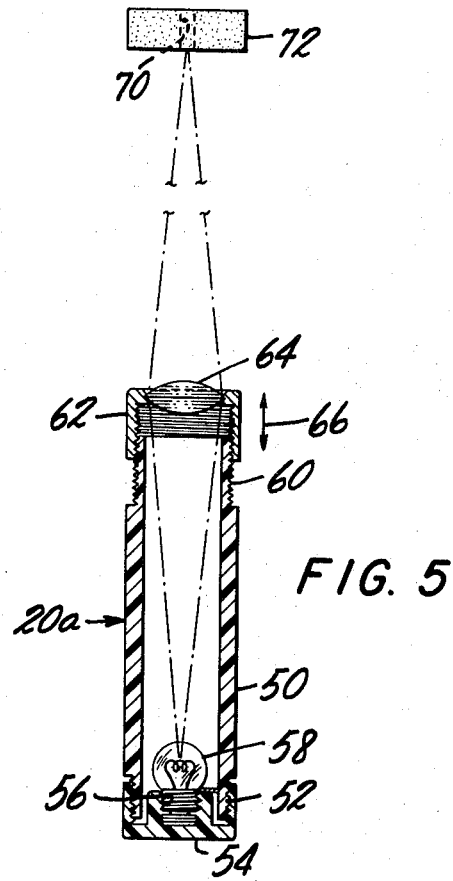

In the preferred embodiment, there are thus sixteen penlights, four associated with each lens-picture combination. All of the penlights are identical and a representative one 20a is shown in FIG. 5. The penlight 20a includes a housing 50 attached by threads 52 to a base 54 formed with a socket 56 within which is screwed a bulb 58 lighted by current from a battery or any other suitable power source. The end of the penlight 20a opposite the bulb 58 and base 54 is formed with threads 60 adapted to receive a threaded end cap 62 mounting a lens 64. The cap 62 can be adjusted in a direction parallel to its optical axis as shown by the double-headed arrow 66 by turning clockwise or counterclockwise on the thread 60 in order to focus the image of the lamp 58 at an aperture 70 of a reticle 72. The reticle 72 is opaque except at the aperture 70. Opacity can be achieved in any desired manner, for example, by vacuum deposition of a mirror coating on the side of the reticle 72 facing the penlight 20a. The film 16 is mounted closely adjacent to the reticle 72 on the side thereof opposite the penlight 20a. In this manner, when the shutter of the camera is actuated to expose a picture, it simultaneously permits exposure of a small area of the film 16 which serves as the fiducial mark 35a.

Figure 4:
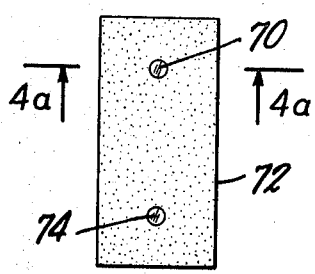
FIG. 4 is a bottom plan view of a portion of the apparatus of FIGS. 1–3.
Figure 4A:
FIG. 4a is a sectional view taken along the line 4a—4a of FIG. 4 and looking in the direction of the arrows.

FIGS. 4 and 4a show the reticle 72 in greater detail. As FIG. 4 shows, the reticle 72 is formed with an additional aperture 74 by virtue of which another penlight 20c forms the fiducial mark 34c. In the illustrated embodiment, there are thus eight reticles corresponding to the reticle 72, one at each end of each of the pictures 35', 36', 38', and 40'. The reticle 72, together with the penlights 20a and 20c, facilitates formation of the fiducial marks 34a and 34c; likewise, there is an additional reticle associated with the penlights 20b and 20d for forming the fiducial marks 35b and 35d; another reticle associated with the penlights 22a and 22c for forming the fiducial marks 36a and 36c; another reticle associated with the penlights 22b and 22d for forming the fiducial marks 36b and 36d; another reticle associated with the penlights 24a and 24c for forming the fiducial marks 38a and 38c; another reticle associated with the penlights 24b and 24d for forming the fiducial marks 38b and 38d; another reticle associated with the penlights 26a and 26c for forming the fiducial marks 40a and 40c; and another reticle associated with the penlights 26b and 26d for forming the fiducial marks 40b and 40d. All of the reticles are identical to the one shown in FIGS. 4 and 4a. The reticles are mounted in corresponding and predetermined positions with respect to the picture areas to which they are respectively proper. In this way, each fiducial mark is accurately positioned.

Figure 6:
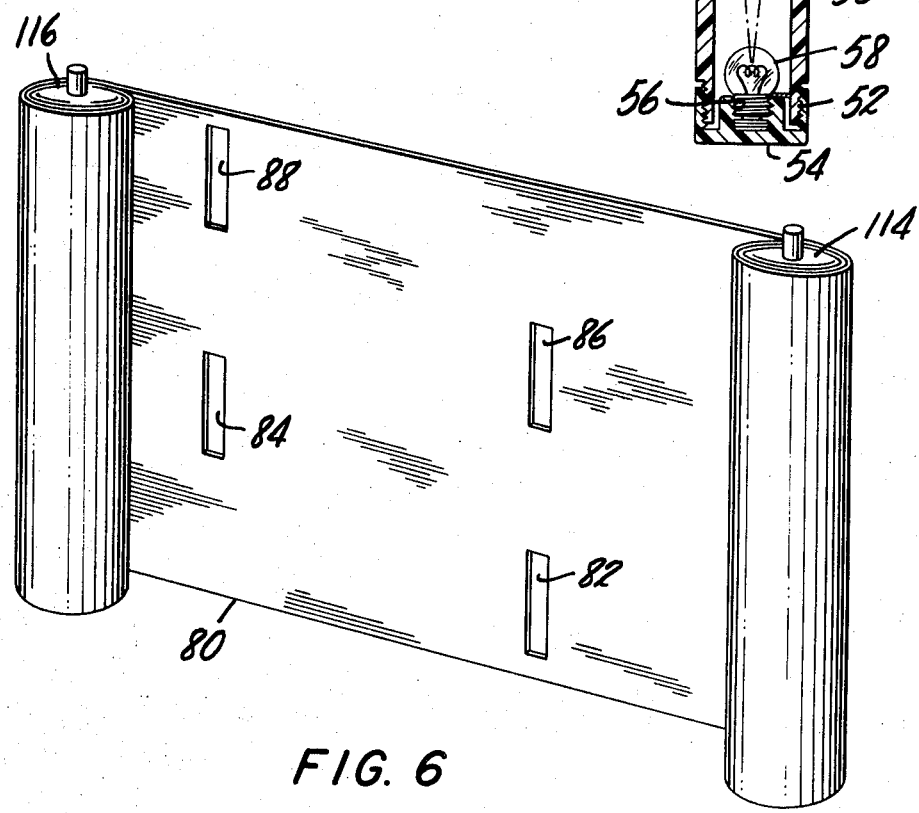
FIG. 6 is a bottom perspective view of a portion of the apparatus of FIGS. 1–3.

FIG. 6 shows a focal-plane shutter 80 formed with apertures 82, 84, 86, and 88 corresponding respectively to the pictures 35', 36', 38', and 40' and to the lenses 28, 30, 32, and 34. Upon actuation of the shutter 80, the aperture 82 sweeps the picture area 35' at the same time as the aperture 84 sweeps the picture area 36', the aperture 86 sweeps the picture area 38', and the aperture 88 sweeps the picture area 40'. The four pictures are thus exposed simultaneously and in the same directional sense: left to right or right to left. The synchronism is exact and is easily and inexpensively achieved. In contrast, if four between-the-lens shutters are used, for example, one for each lens, synchronization is both more expensive and less certain. It is more expensive because of the need for four independent shutters and related apparatus. It is less certain because differences in spring tension, shutter friction, shutter inertia, etc., may exist notwithstanding care in manufacture. The use of the focal-plane shutter 80 also makes it easy to obtain very short exposure times by making the apertures 82, 84, 86, and 88 sufficiently narrow. While the apertures are shown as fixed in width, they may be variable to facilitate adjustment of exposure time.

The shutter 80 can be of the capping type having an auxiliary shade (not shown) that is drawn across the shutter 80 prior to the return stroke to prevent exposure of the film 16 during the return stroke of the shutter 80.

The camera 10 includes a vacuum platen 90 formed with apertures 92 communicating with a vacuum chamber 94 attached by a coupling 96 to a hose 98 containing a valve 100 and connected to a vacuum pump (not shown). The magazine 14 including the vacuum platen 90 and the supply of film is detachable not only from the camera housing 12 but also from the hose 98. The partial vacuum established in the chamber 94 when the hose 98 is connected to the magazine 14 by the coupling 96 and the valve 100 is open facilitate pressing of the film 16 by the atmosphere (acting on the side of the film 16 opposite the vacuum platen 90) firmly against the platen 90 so that it is accurately maintained in a plane. In this way, each of the pictures 34, 36, 38 and 40 is in sharp focus throughout its extent.

The film 16 is unwound from a supply spool 102 and trained about an idler roller 104 with the emulsion side 106 thereof facing the lenses 20, 22, 24 and 26 in the usual manner. The film is trained about an idler roller 108 and wound onto a take-up spool 110. The shutter 80 moves in the direction indicated by a double-headed arrow 112 between rolls 114 and 116 to expose the pictures 34, 36, 38 and 40 simultaneously.

After exposure of the pictures 35', 36', 38', and 40', the film 16 is advanced by any suitable control, such as a lever connected to the axle 111 of the take-up spool 110, so that four additional exposures can be made. The fiducial marks are arranged as shown in FIG. 3 along straight lines between adjacent pairs of formats. The film 16 is advanced a distance slightly exceeding the length of two picture formats. While this leaves more than half of the film unexposed, it provides a superior viewing format. The principal points form a parallelogram that is skewed with respect to the film strip so that each principal point is on a different track parallel to the length of the film. The picture areas are thus arranged in checkerboard fashion so that, when the exposed film is developed and run through the viewer, no part of one transparency is projected through an optical system intended for another transparency. As a result, the film can be scanned through the viewer film gate in a continuous motion and a rapid search for anomalies can be made.

FIG. 8 shows the developed film 16' and the four picture transparencies 35', 36', 38', and 40'. The picture transparencies 35', 36', 38', and 40' are mirror images of the pictures as shown in FIG. 3 where the transparencies 35', 36', 38', and 40' of the film 16' are produced emulsion-to-emulsion by contact with the developed negative.

Projection lenses 120, 122, 124, and 126, respectively associated with the pictures 35', 36', 38', and 40' are provided for projecting images on a screen 128 shown in FIG. 7.

The projection lenses 120, 122, 124, and 126 are moved in the x, y and z directions as shown in FIGS. 7, 7a, and 8. Movement in the z direction is accomplished by means of threaded barrels 190 as shown in FIG. 7a. This changes the scale of the projected imagery, within limits imposed by the depth of field. The projection lenses are mounted on adjustment means such as microscope stages 140, 142, 144, and 146, respectively, by which the projection lenses can be independently adjusted in each of two mutually perpendicular directions labelled x and y as shown by double-headed arrows in FIG. 8. The microscope stages 140, 142, 144, and 146 are conventional per se and may include for example, threaded worms engageable with threaded nuts.

For clarity, FIGS. 7 and 7a show in each case only two of the four projection systems. FIG. 7 shows projection lenses 120 and 124 for projecting images of the pictures 35' and 38' onto the screen 28. A folding mirror 150 folds the viewer optics and means is provided including masks 152 and 154 for eliminating vignetting. A vacuum platen (not shown) holds the film 16' flat in the viewer film gate. The photographic formats can be superimposed on the viewing screen 128 at any conjugate distance since a different part of the field angle is subtended by the formats.

Condensing lenses including lenses 156 and 158 (FIG. 7) and 156 and 160 (FIG. 7a) facilitate illumination of the four film transparencies. Partially silvered mirrors including mirrors 162 and 164 (FIG. 7a) and 162 and 166 (FIG. 7) mix light from desaturation lamps including lamps 170 and 172 (FIG. 7a) and 170 and 174 (FIG. 7) with filtered light from projection lamps including lamps 176 and 178 (FIG. 7a) and 176 and 180 (FIG. 7). The projection lamps and desaturation lamps are of individually controllable luminous intensity. In this way, the brightness of the projected image of each individual picture and the saturation of each individual picture can be individually controlled. Moreover, the luminous intensities of the desaturation lamp and the projection lamp associated with a given picture can be coordinated. For example, as the luminous intensity of the desaturation lamp is increased to desaturate the projected image, the luminous intensity of the projection lamp can be reduced sufficiently to maintain the brightness of the projected image constant. In this way, it is possible to observe the effects of desaturation of a single projected image independently of the effects of changes in brightness. Similarly, the brightness of a projected image can be modified with or without modifying saturation, depending on the luminous intensity of the associated desaturation lamp. The luminous intensities of the light sources can be varied without modification of their color temperatures by a continuously variable, solid-angle filter of the type disclosed in my copending application Ser. No. 627,539, filed Mar. 3, 1967.

The hue of each individual projected image can be altered to any desired dominant wavelength. To this end, colored filters 182 and 184 (FIG. 7A) and 182 and 186 (FIG. 7) are provided.

Thus, in accordance with the invention, the luminous intensity of each projection lamp is individually controlled, the luminous intensity of each desaturation lamp is individually controlled, and the color of each projection filter is individually controlled (by substituting filters or otherwise altering the dominant wavelength of the light from the projection lamps). This greatly facilitates rapid and precise multispectral photographic analysis.

Because of the ability to move the projection lenses in three mutually perpendicular directions, it is possible to align very precisely the projected images of corresponding fiducial marks on the screen 128. Since a filter of a different color is associated with each fiducial mark of a set of associated fiducial marks appearing, say, near the lower left-hand corner of the composite projected image (as well as near each of the other corners), the fiducial marks appear on the screen 128 in color to the extent that they are not in registration. To the extent that they are in registration, they appear as the sum of the colors of the filters. For example, if the three primary colors are used as filters in the projection of three of the fiducial marks, the fourth being projected without a filter or being blanked, then when the projected images of the fiducial marks are accurately superimposed the composite color is white. If they are nearly but not quite in perfect registration, colors fringing a central white area are seen. If they are badly misaligned, separate colored marks will be seen. When the projected images of the fiducial marks near each corner of the composite image on the viewing screen are all made to coincide, perfect registration of the projected images of the pictures has been achieved. This is accomplished in accordance with the invention in a minimum length of time. Reduction of the data can then be undertaken with great confidence.

Thus there is provided in accordance with the invention novel and highly-effective photographic methods and apparatus particularly adapted for use in multispectral photographic analysis. Many modifications of the representative embodiment disclosed above will readily occur to those skilled in the art. For example, while the film is shown as a single strip, a plurality of film strips may be employed in accordance with the invention. Also, while penlights are shown for producing the fiducial marks, ambient lighting can also be used. Further, means can be provided for adjusting the angular orientation of the film in the plane thereof in the viewer film gate. The invention is to be construed as including all of the modifications thereof within the scope of the appended claims.

I claim:

1. A method of multispectral photography comprising the steps of simultaneously unexposed black-and-white photographic film in a multispectral camera, forming a plurality of pictures of a common scene overflown by an airplane or satellite or the like simultaneously on said photographic film, said pictures utilizing respectively primarily different regions of the actinic electromagnetic spectrum, forming a plurality of fiducial marks on said film in the same relative positions with respect to each said picture, each fiducial mark on each of said pictures corresponding to a fiducial mark on each of the other pictures and each fiducial mark constituting an area and not a thin line, developing said pictures, mounting said developed pictures in a multispectral photographic additive color film projector, simultaneouly projecting said developed pictures and fiducial marks on a viewing screen using lights of selected chromaticities, the chromaticity of the light illuminating at least one of said developed pictures being substantially different from the chromaticity associated with the corresponding exposing spectral zone for that picture, utilizing differently colored filters in projecting said fiducial marks, a differently colored filter being operatively associated with each fiducial mark of a set of corresponding fiducial marks, so that:

to the extent that the projected images of corresponding fiducial marks fail to coincide on said viewing screen, the images of such fiducial marks are colored in accordance with the individual colors of the filters respectively associated therewith; and to the extent that the projected images of corresponding fiducial marks do coincide on said viewing screen, the images of such fiducial marks are colored in accordance with the additive colors of the filters respectively associated therewith; and bringing corresponding ones of the projected images of said fiducial marks into coincidence, whereby the projected images of said pictures are accurately superimposed to form a composite image for viewing in false color.

2. A method according to claim 1 comprising the further step of adjusting the relative scale of said projected images of said pictures with respect to one another so that the scale of each image as projected on said viewing screen is the same.

3. In a multispectral photographic additive color film projector for simultaneously projecting through separate projection lenses a plurality of black-andwhite multispectral pictures on a viewing screen, the improvement wherein the optical centers of said projection lenses are arranged in the corners of a parallelogram which is not a rectangle whereby they cooperate with said pictures in which the centers of the pictures are in the corners of a parallelogram which is not a rectangle.

4. A projector according to claim 3 wherein the adjacent sides of the parallelogram are unequal.

* * * * *